United States Patent
Sakata et al.

(10) Patent No.: US 9,514,362 B2
(45) Date of Patent: Dec. 6, 2016

(54) CONTROL METHOD FOR VEHICLE

(71) Applicants: TOYOTA BOSHOKU KABUSHIKI KAISHA, Aichi-ken (JP); DENSO CORPORATION, Aichi-ken (JP)

(72) Inventors: Masaru Sakata, Toyota (JP); Keisuke Toda, Kariya (JP); Minori Yamataka, Nisshin (JP); Takeshi Enya, Nagoya (JP)

(73) Assignees: TOYOTA BOSHOKU KABUSHIKI KAISHA, Aichi-ken (JP); DENSO CORPORATION, Aichi-ken (JP)

( * ) Notice: Subject to any disclaimer, the term of this patent is extended or adjusted under 35 U.S.C. 154(b) by 0 days.

(21) Appl. No.: 14/721,257

(22) Filed: May 26, 2015

(65) Prior Publication Data

US 2016/0132725 A1    May 12, 2016

(30) Foreign Application Priority Data

Nov. 10, 2014   (JP) .................................. 2014-227988

(51) Int. Cl.
*G06K 9/00* (2006.01)
*B62D 1/181* (2006.01)
*G06K 9/32* (2006.01)

(52) U.S. Cl.
CPC ........... *G06K 9/00604* (2013.01); *B62D 1/181* (2013.01); *G06K 9/3208* (2013.01)

(58) Field of Classification Search
CPC .... G06K 9/00604; G06K 9/3208; B62D 1/181

USPC ............................................................ 701/36
See application file for complete search history.

(56) References Cited

U.S. PATENT DOCUMENTS

| 8,676,450 | B2* | 3/2014 | Kohara | B62D 1/181 |
| | | | | 116/31 |
| 2004/0122574 | A1* | 6/2004 | Inman | B60N 2/0248 |
| | | | | 701/49 |
| 2008/0021616 | A1* | 1/2008 | Aoki | G06K 9/00201 |
| | | | | 701/45 |
| 2009/0288305 | A1* | 11/2009 | Tentrup | G01B 5/255 |
| | | | | 33/203.12 |
| 2013/0166154 | A1* | 6/2013 | Kohara | B62D 1/181 |
| | | | | 701/49 |

FOREIGN PATENT DOCUMENTS

JP        7-25271        1/1995

\* cited by examiner

*Primary Examiner* — Richard Camby
(74) *Attorney, Agent, or Firm* — Greenblum & Bernstein, P.L.C.

(57) ABSTRACT

A control method for a vehicle includes: predicting a position of an eye point of an occupant after a state of a vehicle seat is changed based on amount of adjustment of an adjusting mechanism due to change in state of the vehicle seat; determining whether or not the predicted position of the eye point is located within a measurement range of a camera member installed to a steering member; and if it is determined that the predicted position of the eye point is not located within the measurement range of the camera member, moving the measurement range of the camera member toward the predicted position of the eye point synchronously with the steering member.

2 Claims, 5 Drawing Sheets

CONTROL METHOD FOR VEHICLE

INCORPORATION BY REFERENCE

The disclosure of Japanese Patent Application No. 2014-227988 filed on Nov. 10, 2014 including the specification, drawings and abstract is incorporated herein by reference in its entirety.

BACKGROUND OF THE INVENTION

1. Field of the Invention

The present invention relates to a control method for a vehicle including a vehicle seat a state of which, such as a posture and a position, is changeable via a plurality of adjusting mechanisms, and a camera member capable of detecting an eye point of an occupant within a certain measurement range.

2. Description of Related Art

For vehicles of this type, in consideration of optimization of vehicle environments for occupants, it is desired to precisely detect eye points (eyes) of an occupant seated in a vehicle seat. Based on the precisely detected eye points, orientations of side mirrors or positions of a head-up display are optimized for the occupant. As techniques of this type, in a vehicle disclosed in Japanese Patent Application Publication No. 07-25271, after sitting in a vehicle seat, an occupant manipulates a pair of joysticks to detect an eye point of the occupant. The pair of joysticks are turnably disposed on the right side and on the left side of a steering member of an instrument panel located therebetween. In this conventional technique, after sitting in the vehicle seat, the occupant manually manipulates the joysticks to orient them to be seen as a point, thereby precisely detecting the position of the eye point.

SUMMARY OF THE INVENTION

In the conventional technique, at the time of detecting the position of the eye point of the occupant, it is extremely tedious to manually manipulate the pair of joysticks. It may be possible to automatically detect an eye point of an occupant using a camera member such as a stereo camera. Unfortunately, in the case of using a camera member, there exists a certain region where a position of an eye point can be detected with desired accuracy (measurement range), and thus there is a problem that the position of the eye point of an occupant cannot precisely be detected if the eye point of the occupant deviates from this measurement range. The present invention provides a control method for a vehicle capable of more precisely detecting the position of the eye point of an occupant using a camera member.

In a control method for a vehicle according to one aspect of the present invention, the vehicle includes: a steering member that automatically moves in a frontward and backward direction and in an upward and downward direction relative to an instrument panel; a vehicle seat disposed at a position facing the steering member; and a camera member that detects a state of a compartment of the vehicle on a vehicle seat side within a certain measurement range. The vehicle seat includes an adjusting mechanism that changes a posture of the vehicle seat, or a position of the vehicle seat in the compartment of the vehicle, and changes a state of the vehicle seat in accordance with an occupant in a sitting state. In the aspect of the present invention, the adjusting mechanism is so operated as to change the state of the vehicle seat in accordance with the occupant in the sitting state, and to position an eye point of the occupant within the measurement range of the camera member. The camera member is installed to the steering member. In this configuration, it is desirable to more precisely detect the position of the eye point of the occupant using the camera member.

To address this, according to the aspect of the present invention, it is configured to more precisely detect the position of the eye point of the occupant using the camera member as follows. Specifically, the position of the eye point of the occupant after the state of the vehicle seat is changed is predicted based on amount of adjustment of the adjusting mechanism due to change in state of the vehicle seat. It is then determined whether or not the predicted position of the eye point is located within the measurement range of the camera member. If it is determined that the predicted position of the eye point is not located within the measurement range, the measurement range of the camera member is moved toward the predicted position of the eye point synchronously with the steering member. According to the aspect of the present invention, it is possible to more precisely predict the position of the eye point based on the amount of adjustment of the adjusting mechanism, and more accurately determine whether or not the predicted position of the eye point (eye point after the state is changed) is located within the measurement range of the camera member. It is also possible to smoothly move the measurement range of the camera member toward the predicted position of the eye point synchronously with the steering member (member to face the eye point of the occupant).

According to the aspect of the present invention, it is possible to more precisely detect the position of the eye point of the occupant using the camera member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
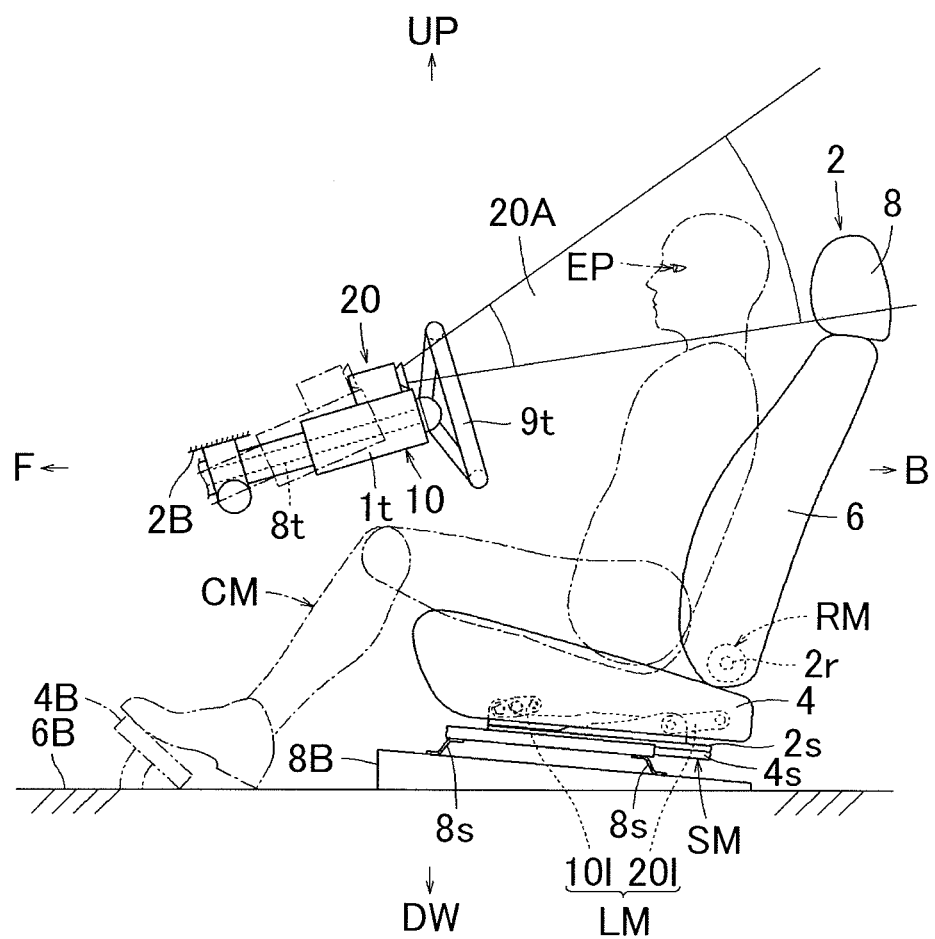
FIG. 1 is a schematic side view of part of a vehicle compartment.

Embodiments according to the present invention will be described with reference to FIG. 1 to FIG. 5, hereinafter. In each drawing, a reference character "F" denotes a frontward direction of a vehicle seat, a reference character "B" denotes a backward direction of the vehicle seat, a reference character "UP" denotes an upward direction of the vehicle seat, and a reference character "DW" denotes a downward direction of the vehicle seat, respectively. In a vehicle compartment of FIG. 1, there are provided, as basic components of the vehicle compartment, an instrument panel 2B, a pedal 4B, a floor surface 6B, a vehicle seat 2, a steering member 10, and a camera member 20. The instrument panel 2B is a wall body that is located at a front section of the vehicle compartment, and standingly extends from the floor surface 6B, and the instrument panel 2B is provided with the steering member 10 and the camera member 20 described later (only part of the instrument panel is shown in FIG. 1 for convenience of explanation). The pedal 4B is disposed at the front section of the floor surface 6B in the vehicle compartment, and is located below the instrument panel 2B.

Figure 4:
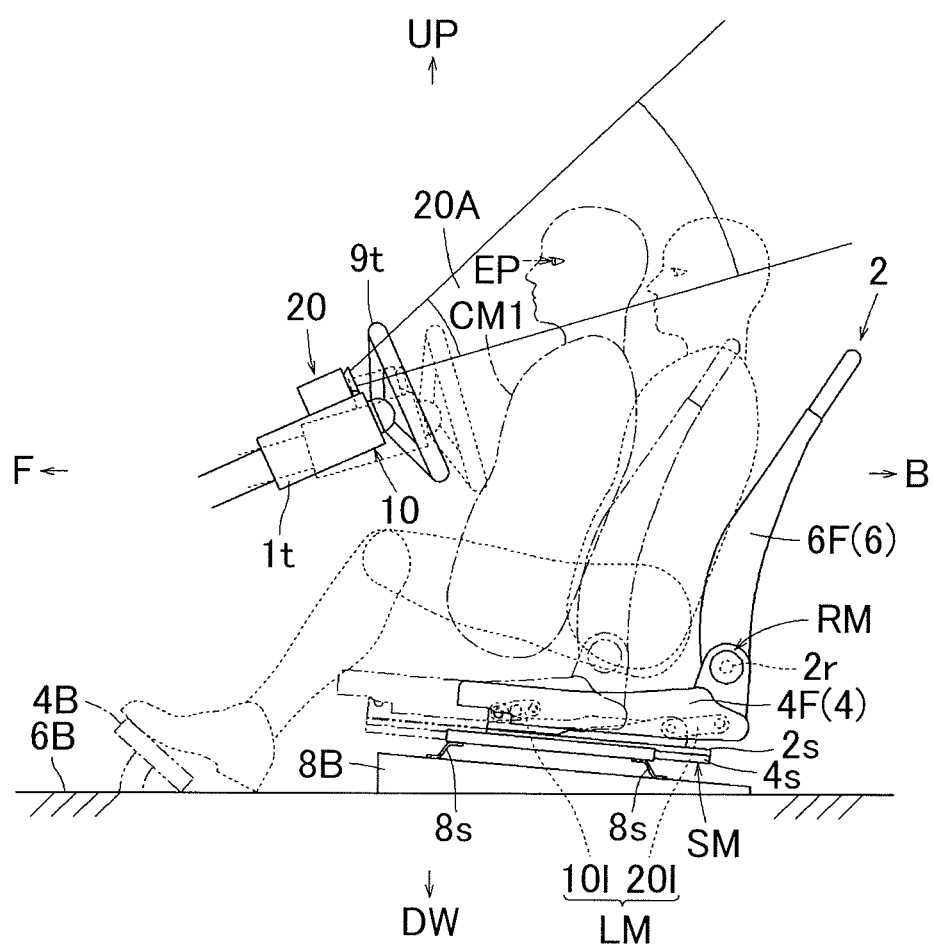
FIG. 4 is a schematic side view of part of the vehicle compartment showing part of a vehicle seat after a state of the seat is changed.

The vehicle seat 2 is placed on the floor surface 6B at a more backward position than the instrument panel 2B in the vehicle compartment in a manner as to be at a position facing the steering member 10 and the camera member 20. With reference to FIG. 1, the vehicle seat 2 includes a seat cushion 4, a seat back 6, a head rest 8, and a plurality of adjusting mechanisms (a sliding mechanism SM, a lifter mechanism LM, a recliner mechanism RM) described later. The seat back 6 is tiltably coupled to a rear part of the seat cushion 4, and the head rest 8 is placed at a top of the seat back 6 in a stand-up state. With reference to FIG. 4, each of these seat components includes a seat frame (such as 4F and 6F) forming a seat framework, a seat pad (not shown) elastically supporting an occupant CM on the seat frame, and a seat cover (not shown) covering the seat pad.

In the present embodiment, with reference to FIG. 4, at least one of the adjusting mechanisms described later is so operated as to change a state of the vehicle seat 2 in accordance with the occupant CM in a sitting state. At this time, an eye point EP of the occupant CM is positioned within a measurement range 20A that is a certain region where the eye point EP of the occupant CM can be detected by the camera member 20 with desired accuracy. In this manner, based on positional information regarding the eye point EP detected by the camera member 20, the orientation of side mirrors (not shown) and the position of a head-up display (not shown) are optimized in accordance with the occupant CM. In a configuration of this type, it is desirable to more precisely detect the position of the eye point EP of the occupant CM using the camera member 20. In the present embodiment, it is configured to more precisely detect the position of the eye point EP of the occupant CM through the following configurations (a first stage to a third stage). Each configuration will be described in detail, hereinafter.

Figure 2:
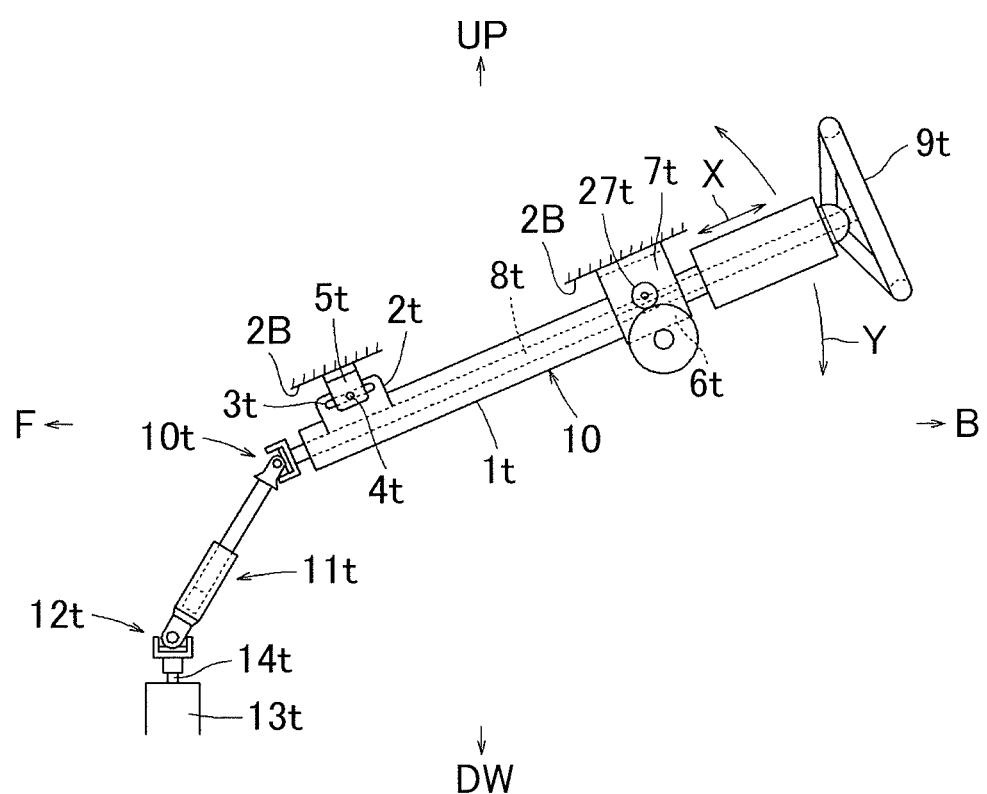
FIG. 2 is a schematic side view of a steering member.
Figure 3:
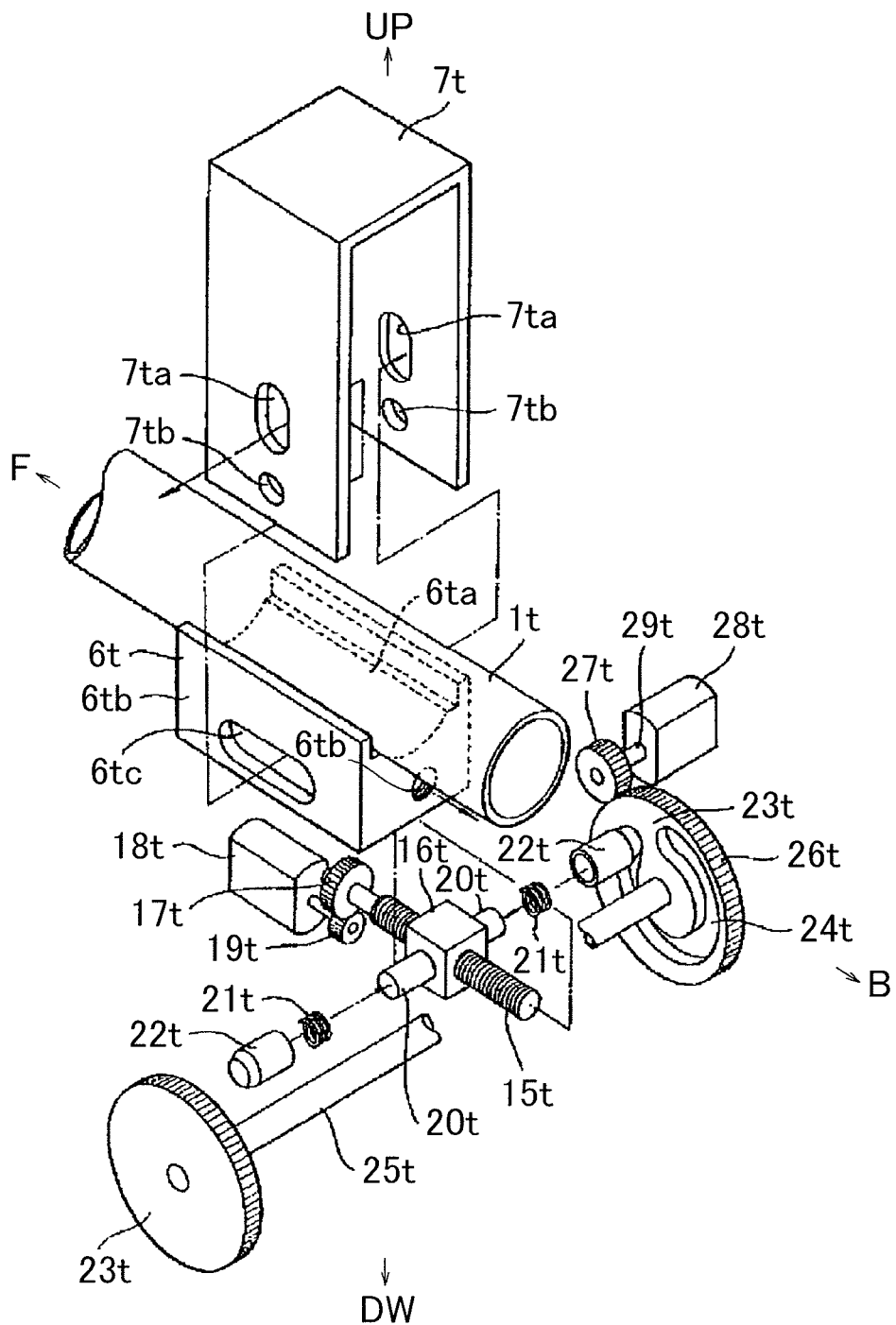
FIG. 3 is an exploded perspective view of a movable bracket and a fixed bracket.

With reference to FIG. 1 to FIG. 3, the steering member 10 is so disposed as to be movable forward and backward, and upward and downward relative to the instrument panel 2B. The movable range of the steering member 10 is set within a relative range of the eye point EP of the occupant CM who has a common body size. The occupant CM of this type may be supposed to have a body size within a range from an occupant dummy equivalent to AM95 specified by the SAE standards to an occupant dummy equivalent to JF05 specified by the SAE standards.

With reference to FIG. 2, the steering member 10 includes a cylindrical column $1t$, a bar-shaped shaft $8t$ inserted in the column $1t$, and a wheel $9t$ in a wheel shape disposed at an upper end of the shaft $8t$. A lower bracket $2t$ is attached to the vicinity of a lower end of the column $1t$. A long hole $3t$ is formed in the lower bracket $2t$ in a manner as to extend parallel to the column $1t$, and the lower bracket $2t$ is coupled to a vehicle-side bracket $5t$ of the instrument panel 2B via a bolt shaft $4t$ fixed through the long hole $3t$. A movable bracket $6t$ is fixed to the vicinity of an upper end of the column $1t$. The movable bracket $6t$ is engaged with a fixed bracket $7t$ of the instrument panel 2B in a manner as to be movable both in an arrow X direction and in an arrow Y direction as shown in FIG. 2 (relation between the fixed bracket and the movable bracket will be described in detail later). The wheel $9t$ is coupled to the upper end of the shaft $8t$ inserted in the column $1t$, and an extendable universal shaft $11t$ is coupled to a lower end of the shaft $8t$ via a universal joint $10t$. The extendable universal shaft $11t$ is also coupled to a shaft $14t$ of a gear box $13t$ through a universal joint $12t$.

With reference to FIG. 3, the movable bracket $6t$ is a box member having a curved top surface that is a recessed portion $6ta$. Long holes $6tc$, $6tc$ are respectively formed in both side surfaces of the movable bracket $6t$, and circular holes $6tb$, $6tb$ are respectively formed in both front and rear surfaces thereof. A screw shaft $15t$ is inserted through both circular holes $6tb$, $6tb$, and this screw shaft $15t$ is screwed with a slider $16t$ having a cubic block body. The screw shaft $15t$ extends in the axial direction in parallel with the column $1t$, and has a gear $17t$ outside the movable bracket $6t$. An output shaft $19t$ of a normally-reversely rotatable electric motor $18t$ is meshed with the gear $17t$ of the screw shaft $15t$. The electric motor $18t$ is fixed to an outer circumference of the column $1t$. Arm shafts $20t$ are projectingly provided at both side surfaces of the slider $16t$. These arm shafts $20t$ are respectively inserted through the long holes $6tc$, $6tc$ of the movable bracket $6t$ and through long holes $7ta$, $7ta$ that are vertically formed in the fixed bracket $7t$. A spring $21t$ is inserted, and then a cap $22t$ is fitted onto each arm shaft $20t$. An end of each cap $22t$ has a truncated cone shape. While each cap $22t$ is fitted in a circinate groove $24t$ engraved one surface (inner surface) of each cam $23t$, both cams $23t$ are integrally rotatable around a shaft $25t$ axially supported by through holes $7tb$, $7tb$ formed in the fixed bracket $7t$, and a gear $26t$ is formed on a circumferential surface of at least one of the cams $23t$. The gear $26t$ is meshed with a gear $27t$ rotatably journaled by the fixed bracket $7t$, and the gear $27t$ is rotatable by an output shaft $29t$ of a normally-reversely rotatable electric motor $28t$ fixed to the fixed bracket $7t$.

In the present embodiment, the movable bracket $6t$ is moved in the arrow X direction in FIG. 2 relative to the fixed bracket $7t$, thereby moving the steering member 10 (column $1t$) in the frontward and backward direction relative to the instrument panel 2B. At this time, with reference to FIG. 3, the electric motor $18t$ is driven to rotate the screw shaft $15t$ through the output shaft $19t$. If the screw shaft $15t$ rotates clockwise, the slider $16t$ tends to move toward the upper end of the column $1t$, but the arm shafts $20t$ of the slider $16t$ are fitted in the long holes $7ta$, and thus the slider $16t$ is prevented from moving in this direction; therefore, as a reaction of this, the movable bracket $6t$ moves toward the wheel $9t$ side. The movable bracket $6t$ via the long holes $6tc$, $6tc$, and the lower end of the column $1t$ via the long hole $3t$ of the lower bracket $2t$ and the bolt $4t$ engaged with this long hole $3t$, respectively follow the overall movement of the column $1t$, thereby allowing the wheel $9t$ to move closer to the vehicle seat 2 side (see FIG. 1 to FIG. 4). On the other hand, the screw shaft $15t$ rotates counterclockwise, the movable bracket $6t$ moves toward the lower end of the column $1t$, and thus the wheel $9t$ moves apart from the vehicle seat 2. In this manner, the normal and reverse rotation of the electric motor $18t$ allows the steering member 10 along with the movable bracket $6t$ to be movable in the frontward and backward direction that is the arrow X direction within a range of the long holes $6tc$, $6tc$.

The movable bracket $6t$ is moved in the arrow Y direction in FIG. 2 relative to the fixed bracket $7t$, thereby moving the steering member 10 (column $1t$) in the upward and downward direction relative to the instrument panel 2B. At this time, with reference to FIG. 3, each cam $23t$ is rotated through the output shaft $29t$ by driving the electric motor $28t$ to normally rotate. At this time, if each cam $23t$ rotates clockwise through the gear 27t, each circinate groove 24t eccentrically rotates, and each cap 22t engaged with the corresponding circinate groove 24t moves apart from the shaft 25t of the cam 23t, and thus gradually moves upward from the lower end of the long hole 7ta of the fixed bracket 7t. Hence, the movable bracket 6t pushed upward by the slider 16t moves upward relative to the fixed bracket 7t; thus, the column 1t tiltingly moves upward around the bolt shaft 4t of the lower bracket 2t. To the contrary, if the electric motor 28t is driven to reversely rotate, each cap 22t moves downward. Accordingly, the normal and reverse rotation of the electric motor 28t enables the steering member 10 along with the movable bracket 6t to be movable in the upward and downward direction that is the Y direction within a range of the long holes 7ta of the fixed bracket 7t.

With reference to FIG. 1 and FIG. 4, the camera member 20 is a member capable of detecting a state of the vehicle compartment on the vehicle seat 2 side within a curtain measurement range 20A. As the camera member 20 of this type, a single-lens camera member or a multiple-lens camera member (stereo camera) may be exemplified, and the camera member of either type is capable of detecting the state of the vehicle compartment (e.g., position of the eye point EP) within the measurement range 20A with desired accuracy. In the present embodiment, the measurement range 20A is formed in part of a region formed in an approximately conical shape whose apex is located at a finder (reference numeral is omitted in the drawing) of a stereo camera as the camera member 20. Specifically, within the aforementioned region in an approximately conical shape, the measurement range 20A is an area that has a predetermined linear dimension (dimension in the frontward and backward direction of the vehicle) starting from a portion apart from the camera member 20 with a certain distance as well as a predetermined vertical dimension. In the present embodiment, the camera member 20 is installed to the upper portion of the column 1t in a manner as to be movable in the forward and backward direction or in the upward and downward direction with the finder of the camera member 20 facing the vehicle seat 2. This configuration allows the measurement range 20A to be movable synchronously with the movement (upward-downward and frontward-backward movement) of the steering member 10 in the same direction as that of the steering member 10.

With reference to FIG. 1 and FIG. 4, the sliding mechanism SM that is one of the adjusting mechanisms slidingly moves the seat cushion 4 forward and backward in the vehicle compartment, and includes upper rails 2s and lower rails 4s. Each lower rail 4s is a long plate member extending forward and backward along the seat, and has an approximately U shape in its cross sectional view. Each upper rail 2s is a plate member slidably assembled to the corresponding lower rail 4s, and has an approximately U shape in its cross sectional view. In the present embodiment, the seat cushion 4 is installed on a top of each upper rail 2s through the lifter mechanism LM described later, and each lower rail 4s is installed on the floor surface 6B. At this time, each lower rail 4s is installed on a projection 8B on the floor surface 6B via legs 8s disposed at a front portion and a rear portion of the lower rail 4s. The projection 8B is a sloped projection gradually rising from the rear side toward the front side at a tilt angle θ relative to the floor surface 6B. Both rails 2s and 4s are slidably assembled to each other, thereby allowing the seat cushion 4 to slidably move forward and backward relative to the floor surface 6B.

With reference to FIG. 1 and FIG. 4, the lifter mechanism LM that is one of the adjusting mechanisms moves the entire seat cushion 4 in the upward and downward direction, and includes first link arms 101, and second link aims 201. Each first link arm 101 and each second link arm 201 are plate members, each having an approximately rectangular shape in its side view, and axial parts (reference numerals are omitted in the drawing) are rotatably inserted in both ends of each arm. In the present embodiment, one end of each first link arm 101 is rotatably coupled to a front portion of the seat cushion 4, and the other end of this first link arm 101 is rotatably coupled to a front portion of the upper rail 2s. One end of each second link arm 201 is rotatably coupled to a rear portion of the seat cushion 4, and the other end of this second link arm 201 is rotatably coupled to a rear portion of the upper rail 2s. As the first link arms 101 and the second link arms 201 gradually stand up from a backwardly inclined state by motive power of a motor member (not shown), the seat cushion 4 is gradually lifted upward.

With reference to FIG. 1 and FIG. 4, the recliner mechanism RM (in a cylindrical shape) that is one of the adjusting mechanisms recliningly moves the seat back 6 relative to the seat cushion 4, and includes an internal mechanism (not shown), and an operational rod 2r. The operational rod 2r is a long pipe member extending in a seat width direction. In the present embodiment, a lower portion of the seat back 6 is turnably assembled to a rear portion of the seat cushion 4 through the recliner mechanism RM. At this time, the operational rod 2r is extendingly disposed at the lower portion of the seat back 6 to be inserted in the internal mechanism in a bridge manner along the seat width direction. The operational rod 2r is rotated by handling an operating lever (not shown) so as to unlock a lock of the internal mechanism. In this manner, the seat back 6 becomes turnable relative to the seat cushion 4 around the operational rod 2r. If the occupant unhands the operating lever, the operational rod 2r reversely rotates due to an urging force of this lever, so that the internal mechanism is put into a locked state, thereby restricting the reclining movement of the seat back 6 relative to the seat cushion 4.

With reference to FIG. 1, in an optimum state of the vehicle seat 2, while the occupant CM moderately leans back against the seat back 6, a leg of the occupant CM is so moderately bent as to reach the pedal 4B. In this state, at least one of the plurality of mechanisms SM, LM, and RM is so operated as to change the state of the vehicle seat 2 to an optimum state in accordance with the occupant CM in a sitting state. For example, the recliner mechanism RM is so operated as to adjust a reclining degree of the seat back 6 relative to the seat cushion 4 (to change the posture of the seat). This operation brings the vehicle seat 2 into a state that allows the occupant CM to moderately lean back against the seat back 6. At least one of the sliding mechanism SM and the lifter mechanism LM is so operated as to adjust a distance between the seat cushion 4 and the pedal 4B in the forward and backward direction and in the upward and downward direction (to change the position of the seat in the vehicle compartment). This operation brings the vehicle seat 2 into a state that allows the leg of the occupant CM to be so moderately bent as to reach the pedal 4B.

In the present embodiment, with reference to FIG. 4, it is assumed that an occupant whose body size is a little small (referred to simply as an occupant CM1, hereinafter) is seated, and the sliding mechanism SM is so operated as to bring the seat cushion 4 closer to the pedal 4B from its initial position in FIG. 1. In this state, the eye point EP of the occupant CM1 is to be detected by the camera member 20, and the steering member 10 and the camera member 20 (measurement range 20A) are both located at their initial positions even after the state of the vehicle seat 2 is changed (see the steering member and the camera member indicated by broken lines in FIG. 4). Hence, it is required to appropriately adjust the positions of the camera member 20 and the measurement range 20A thereof so as to more precisely detect the position of the eye point EP of the occupant CM1.

Figure 5:
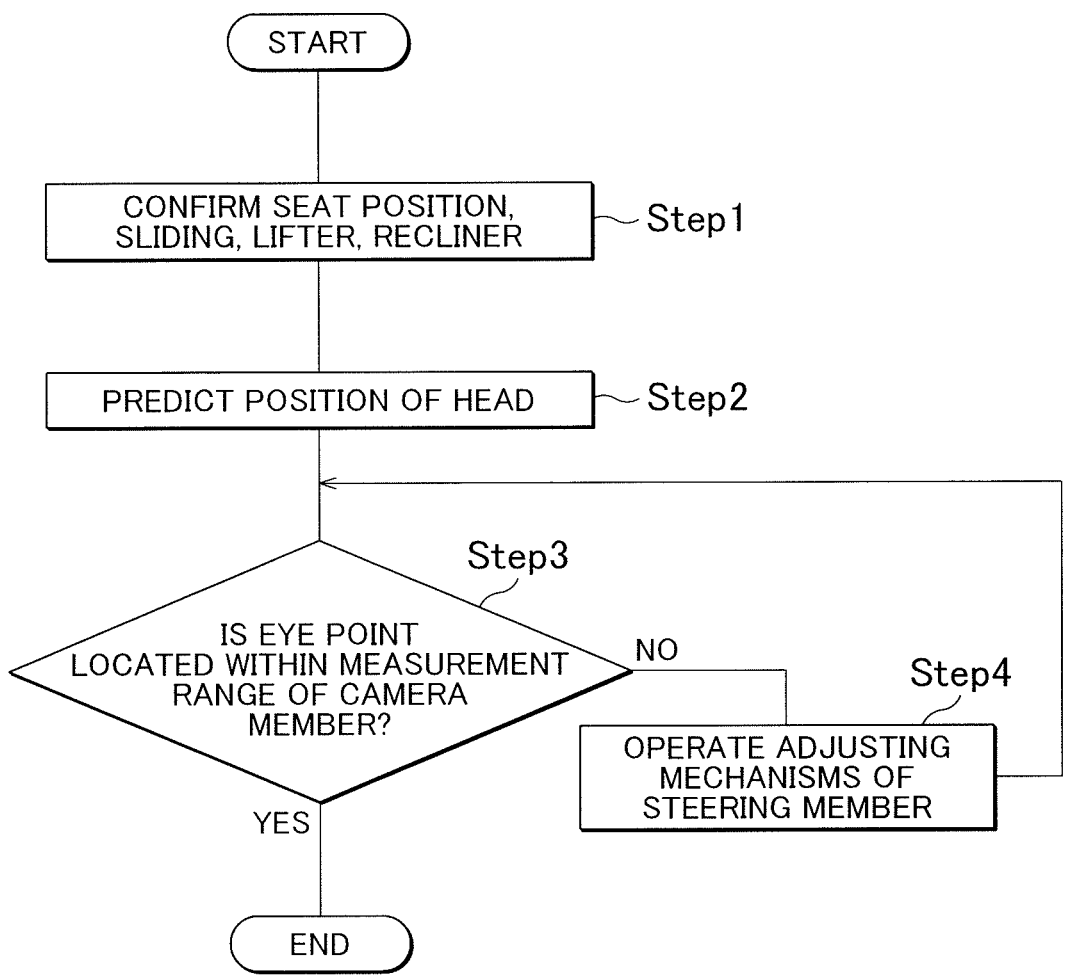
FIG. 5 is a flowchart showing a control procedure of a vehicle.

In the present embodiment, with reference to FIG. 4 and FIG. 5, it is configured to more precisely detect the position of the eye point EP of the occupant CM1 using the camera member 20 through the following first to third stages. In the first stage, with reference to FIG. 4, and Step 1 and Step 2 in FIG. 5, the position of the eye point EP after the state of the vehicle seat 2 is changed is predicted based on the amount of adjustment of the adjusting mechanism due to change in state of the vehicle seat 2. In the present embodiment, the sliding mechanism SM is so operated as to bring the seat cushion 4 closer to the pedal 4B, as aforementioned. In a not-shown controller (e.g., ECU), a coordinate (x) in the upward and downward direction and a coordinate (y) in the forward and backward direction of the vehicle compartment are set. With reference to Step 1 in FIG. 5, the state of the vehicle seat 2 and the coordinates of the eye point EP before the seat is moved are detected by the camera member 20 (or a not-shown another sensor). State information regarding the vehicle seat 2 (adjusting mechanism) before the seat is moved as well as coordinate information (coordinates: x0, y0) regarding the eye point EP before the seat is moved are both input into the controller in advance. As not-shown another sensor of this type, a non-contact type (ultrasonic type, laser type, eddy-current type) sensor may also be disposed at an appropriate position in the vehicle compartment.

With reference to FIG. 4, and Step 2 in FIG. 5, the amount of adjustment of the sliding mechanism SM after the operation of the mechanism SM is input into the controller so as to predict a position of the head of the occupant CM1 (eye point EP) after the state of the seat is changed. In the present embodiment, each lower rail 4s of the sliding mechanism SM is disposed on the projection 8B, thereby allowing the seat cushion 4 to gradually move upward (tilt angle θ) along with its frontward movement through the sliding mechanism SM. At this time, the controller predicts the coordinates (x1, y1) of the eye point EP of the occupant CM1 in the vehicle seat 2 after the movement of the seat based on the amount of adjustment of the sliding mechanism SM. Based on the tilt angle θ of the lower rails 4s, the coordinate (x1) in the forward and backward direction of the eye point EP of the occupant CM1 after the state of the seat is changed can be obtained by calculation (calculation formula: x1=x0-100 cos θ). Similarly, the coordinate (y1) in the upward and downward direction of the eye point EP of the occupant CM1 after the state of the seat is changed can also be obtained by calculation (calculation formula: y1=y0+100 sin θ).

In the second stage, with reference to FIG. 4, and Step 3 in FIG. 5, it is determined whether or not the predicted position of the eye point EP is located within the measurement range 20A. At this time, the position (initial position) of the measurement range 20A of the camera member 20 is recognized by the controller based on the positional information regarding the steering member 10 at the initial position. If it is determined by the controller that the predicted position of the eye point EP is located within the measurement range 20A at the initial position, the task is completed without moving the camera member 20 (end). To the contrary, if it is determined that the predicted position of the eye point EP is not located within the measurement range 20A at the initial position, the task proceeds to the third stage described below.

In the third stage, with reference to FIG. 4, and Step 4 in FIG. 5, the measurement range 20A is moved toward the predicted position of the eye point EP synchronously with the steering member 10. In the present embodiment, for example, the predicted position of the eye point EP of the occupant CM1 is positioned more frontward and upward than that before the sliding mechanism SM is operated. At this time, the steering member 10 is moved along with the camera member 20 frontward and upward by the controller, thereby moving the measurement range 20A synchronously with the steering member 10 toward the predicted eye point EP. In the present embodiment, the steering member 10 is moved frontward and upward by the electric motor 18t and the electric motor 28t (both are adjusting mechanisms of the steering member). Returning to the second stage, if it is determined that the predicted position of the eye point EP is located within the measurement range 20A, the task is stopped (end). To the contrary, in the second stage, if it is determined that the position of the eye point EP is not located within the measurement range 20A, the third stage is executed again (this means that the second and the third stages are repetitively executed).

In the present embodiment, in the first stage, it is possible to more precisely predict the position of the eye point EP based on the amount of adjustment of the adjusting mechanism. Accordingly, in the second stage, it is possible to more accurately determine whether or not the predicted position of the eye point EP (eye point after the state of the seat is changed) is located within the measurement range 20A of the camera member 20. In the third stage, it is possible to smoothly move the measurement range 20A of the camera member 20 toward the predicted position of the eye point EP synchronously with the steering member 10 (member to face the eye point of the occupant). According to the present embodiment, it is possible to precisely detect the position of the eye point EP of the occupant CM1 using the camera member 20.

The vehicle seat of the present embodiment is not limited to the aforementioned embodiments, and other various embodiments may also be applicable thereto. In the embodiments of the present invention, an example of operating the sliding mechanism SM has been described, but the other mechanisms (the lifter mechanism LM, the recliner mechanism RM) may also be operated. For example, in the case of operating the lifter mechanism, it is possible to find the position of the eye point of the occupant after the operation of this mechanism through calculation based on the tilt angle of each link arm, and the like. In the case of operating the recliner mechanism, it is possible to find the position of the eye point of the occupant after the operation of this mechanism through calculation based on the reclining angle of the seat back relative to the seat cushion, and the like.

In the present embodiment, the configuration of installing the camera member 20 to the column 1t has been exemplified, but this is not intended to limit the configuration (shape, dimension, installing position, installation number, etc.) of the camera member. For example, the camera member may be installed to the wheel, thereby detecting the state of the vehicle compartment on the vehicle seat side without being interrupted by other members.

The configuration of the vehicle seat 2 (adjusting mechanisms SM, LM, RM), the configuration of the steering member 10, and the basic components of the vehicle compartment 2B, 4B, 6B according to the embodiments of the present invention may be appropriately modified. The configurations of the embodiments may be applicable to comprehensive transportation means, such as vehicles, aircrafts, and trains, etc.

What is claimed is:

1. A control method for a vehicle including: a steering member that automatically moves in a frontward and backward direction and in an upward and downward direction relative to an instrument panel; a vehicle seat disposed at a position facing the steering member; and a camera member that detects a state of a compartment of the vehicle on a vehicle seat side within a predetermined measurement range, wherein: the vehicle seat includes an adjusting mechanism that changes at least one of a posture of the vehicle seat and a position of the vehicle seat in the compartment of the vehicle, and changes a state of the vehicle seat in accordance with an occupant in a sitting state; the adjusting mechanism is configured to change the state of the vehicle seat in accordance with the occupant in the sitting state, and to position an eye point of the occupant within the predetermined measurement range of the camera member; and the camera member is installed on the steering member, the control method for the vehicle comprising:

predicting a position of the eye point of the occupant after the state of the vehicle seat is changed, based on an amount of adjustment of the adjusting mechanism due to a change in the state of the vehicle seat;

determining whether or not the predicted position of the eye point is located within the predetermined measurement range of the camera member;

if it is determined that the predicted position of the eye point is located within the predetermined measurement range of the camera member, determining that a movement of the predetermined measurement range of the camera member is not required; and if it is determined that the predicted position of the eye point is not located within the predetermined measurement range of the camera member, moving the predetermined measurement range of the camera member toward the predicted position of the eye point synchronously with the steering member.

2. The control method for the vehicle according to claim 1, further comprising detecting the state of the vehicle seat and coordinates of the eye point before the vehicle seat is moved.

* * * * *